United States Patent
Imura et al.

(10) Patent No.: US 11,619,308 B2
(45) Date of Patent: Apr. 4, 2023

(54) SLIDING COMPONENTS

(71) Applicant: Eagle Industry Co., Ltd., Tokyo (JP)

(72) Inventors: Tadatsugu Imura, Tokyo (JP);
Hiroyuki Hashimoto, Tokyo (JP);
Yuichiro Tokunaga, Tokyo (JP);
Hideyuki Inoue, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 17/690,911

(22) Filed: Mar. 9, 2022

(65) Prior Publication Data

US 2022/0268361 A1    Aug. 25, 2022

Related U.S. Application Data

(62) Division of application No. 16/964,943, filed as application No. PCT/JP2019/003381 on Jan. 31, 2019, now Pat. No. 11,320,052.

(30) Foreign Application Priority Data

Feb. 1, 2018  (JP) .............................. JP2018-016629

(51) Int. Cl.
*F16J 15/34*    (2006.01)
*F16J 15/40*    (2006.01)

(52) U.S. Cl.
CPC ....... *F16J 15/3412* (2013.01); *F16J 15/3424* (2013.01); *F16J 15/40* (2013.01)

(58) Field of Classification Search
CPC ....... F16J 15/3412; F16J 15/3424; F16J 15/40
See application file for complete search history.

(56) References Cited

U.S. PATENT DOCUMENTS 3,383,116 A * 5/1968 Carter ................. F16J 15/3412
                                                277/408
3,527,465 A    9/1970 Guinard
(Continued)

FOREIGN PATENT DOCUMENTS

CN    1245552     2/2000    ............... F16J 15/34
CN    2460801     11/2001   ............... F16J 15/40
(Continued)

OTHER PUBLICATIONS

First Notification of Reason for Refusal with Search Report issued by the State Intellectual Property Office of China dated Aug. 24, 2015 for Chinese counterpart application No. 201380424836.9.
(Continued)

*Primary Examiner* — Nicholas L Foster
(74) *Attorney, Agent, or Firm* — Hayes Soloway P.C.

(57) ABSTRACT

Low-torque sliding components have sliding surfaces rotated relative to each other with an annular mating ring and an annular seal ring facing each other. The sliding surface of at least one of the mating ring and the seal ring has therein a plurality of multi-stepped recess portions formed in a circumferential direction. Relative rotation and sliding of the mating ring and the seal ring causes the multi-stepped recess portions to generate a dynamic pressure, and the multi-stepped recess portion is formed in a stepwise shape in a cross-sectional view by a dynamic pressure recess portion and a static pressure recess portion with the dynamic pressure recess portion surrounding the static pressure recess portion deeper than the dynamic pressure recess portion.

10 Claims, 12 Drawing Sheets

(56) References Cited

U.S. PATENT DOCUMENTS

| | | | |
|---|---|---|---|
| 3,675,935 A | 7/1972 | Ludwig | F16J 15/342 |
| 3,704,019 A | 11/1972 | McHugh | 277/400 |
| 3,782,737 A | 1/1974 | Ludwig et al. | 277/27 |
| 4,056,478 A | 11/1977 | Capelli | C01M 5/00 |
| 4,071,253 A * | 1/1978 | Heinen | F16J 15/342 |
| | | | 277/408 |
| 4,523,764 A * | 6/1985 | Albers | F16J 15/342 |
| | | | 277/408 |
| 4,889,348 A | 12/1989 | Amundson | 277/306 |
| 5,071,141 A | 12/1991 | Lai et al. | |
| 5,092,612 A | 3/1992 | Victor et al. | 277/96.1 |
| 5,174,584 A * | 12/1992 | Lahrman | F01D 11/003 |
| | | | 277/400 |
| 5,180,173 A | 1/1993 | Kimura et al. | |
| 5,224,714 A | 7/1993 | Kimura | 277/400 |
| 5,447,316 A | 9/1995 | Matsui | 277/400 |
| 5,556,111 A | 9/1996 | Sedy | 277/400 |
| 5,558,341 A | 9/1996 | McNickle | 277/400 |
| 5,769,604 A * | 6/1998 | Gardner | F16J 15/3412 |
| | | | 277/306 |
| 5,834,094 A * | 11/1998 | Etsion | F16C 33/043 |
| | | | 277/411 |
| 5,947,481 A | 9/1999 | Young | 277/400 |
| 5,952,080 A * | 9/1999 | Etsion | F16J 15/3424 |
| | | | 277/411 |
| 6,002,100 A * | 12/1999 | Etsion | F16C 33/103 |
| | | | 384/132 |
| 6,046,430 A * | 4/2000 | Etsion | F16J 15/3424 |
| | | | 384/132 |
| 6,135,458 A * | 10/2000 | Fuse | F16J 15/342 |
| | | | 277/400 |
| 6,152,452 A | 11/2000 | Wang | 277/400 |
| 6,213,473 B1 | 4/2001 | Lebeck | |
| 6,446,976 B1 | 9/2002 | Key et al. | F16J 15/34 |
| 6,692,006 B2 | 2/2004 | Holder | 277/346 |
| 6,726,213 B2 | 4/2004 | Wang | 277/400 |
| 7,258,346 B2 | 8/2007 | Tejima | 277/399 |
| 7,377,518 B2 | 5/2008 | Lai | 277/400 |
| 7,758,051 B2 * | 7/2010 | Roberts-Haritonov | |
| | | | F16J 15/342 |
| | | | 277/408 |
| 7,931,277 B2 | 4/2011 | Garrison | 277/399 |
| 8,100,405 B2 | 1/2012 | Kneeland et al. | 277/355 |
| 8,342,534 B2 | 1/2013 | Vasagar | 277/399 |
| 8,585,060 B2 | 11/2013 | Oshii et al. | 277/401 |
| 9,151,390 B2 | 10/2015 | Hosoe | F16J 15/3412 |
| 9,169,931 B2 | 10/2015 | Tokunaga | F16J 15/34 |
| 9,228,660 B2 | 1/2016 | Hosoe | F16J 15/3412 |
| 9,353,867 B2 | 5/2016 | Itadani et al. | F16J 15/3448 |
| 9,494,239 B2 | 11/2016 | Hosoe | F16J 15/342 |
| 9,512,923 B2 | 12/2016 | Inoue et al. | F16J 15/34 |
| 9,574,667 B2 | 2/2017 | Takahashi et al. | F16J 15/342 |
| 9,772,037 B2 | 9/2017 | Itadani et al. | F16J 15/3412 |
| 9,784,372 B2 | 10/2017 | Iguchi | F16F 15/342 |
| 9,863,473 B2 | 1/2018 | Hosoe et al. | F16C 33/741 |
| 9,958,010 B2 | 5/2018 | Itadani | F16C 33/74 |
| 9,982,715 B2 | 5/2018 | Gorges et al. | F16C 33/201 |
| 10,054,230 B2 | 8/2018 | Katori et al. | F16J 15/3412 |
| 10,132,411 B2 * | 11/2018 | Hosoe | F16J 15/164 |
| 10,337,620 B2 * | 7/2019 | Tokunaga | F16J 15/3412 |
| 10,443,737 B2 | 10/2019 | Itadani | F16J 15/342 |
| 10,495,228 B2 | 12/2019 | Itadani | F16J 15/342 |
| 10,865,883 B2 | 12/2020 | Seki et al. | F16J 15/3404 |
| 11,248,706 B2 | 2/2022 | Imura | F16C 33/74 |
| 11,320,052 B2 | 5/2022 | Imura et al. | F16J 15/34 |
| 2002/0014743 A1 | 2/2002 | Zheng | 277/358 |
| 2002/0093141 A1 | 7/2002 | Wang | F16J 15/34 |
| 2002/0158416 A1 | 10/2002 | Hosanna | F16J 15/3404 |
| 2004/0080112 A1 | 4/2004 | Tejima | F16J 15/3436 |
| 2005/0212217 A1 | 9/2005 | Tejima | 277/399 |
| 2005/0263963 A1 | 12/2005 | Lai | 277/399 |
| 2007/0228664 A1 | 10/2007 | Anand | F16J 15/3496 |
| 2007/0267820 A1 | 11/2007 | Martin | F16J 15/3496 |
| 2007/0275267 A1 | 11/2007 | Sabouni | F16J 15/3496 |
| 2007/0296156 A1 * | 12/2007 | Yanagisawa | F16J 15/3412 |
| | | | 277/352 |
| 2008/0100001 A1 | 5/2008 | Flaherty | |
| 2009/0200749 A1 | 8/2009 | Teshima | F16J 15/3484 |
| 2011/0215531 A1 | 9/2011 | Tokunaga et al. | 277/399 |
| 2011/0215535 A1 | 9/2011 | Vasagar | 277/559 |
| 2011/0305871 A1 | 12/2011 | Tabuchi | F16J 15/3284 |
| 2012/0018957 A1 | 1/2012 | Watanabe | F16J 15/34 |
| 2012/0217705 A1 | 8/2012 | Hosoe | 277/400 |
| 2013/0168928 A1 | 7/2013 | Schrufer | C10M 103/02 |
| 2013/0209011 A1 | 8/2013 | Tokunaga | |
| 2014/0159314 A1 | 6/2014 | Hosoe | F16J 15/34 |
| 2014/0197600 A1 | 7/2014 | Hosoe | F16J 15/342 |
| 2014/0217676 A1 | 8/2014 | Hosoe et al. | 277/350 |
| 2014/0319776 A1 | 10/2014 | Theike et al. | |
| 2015/0115540 A1 | 4/2015 | Tokunaga | F16J 15/34 |
| 2015/0123350 A1 | 5/2015 | Itadani | F16J 15/3412 |
| 2015/0167847 A1 | 6/2015 | Tokunaga | |
| 2015/0345642 A1 | 12/2015 | Haas | F16J 15/3496 |
| 2015/0377297 A1 | 12/2015 | Tokunaga et al. | F16C 33/748 |
| 2016/0033045 A1 * | 2/2016 | Itadani | F16J 15/3348 |
| | | | 277/348 |
| 2016/0097457 A1 * | 4/2016 | Sun | F16J 15/3412 |
| | | | 277/400 |
| 2017/0241549 A1 | 8/2017 | Itadani | F16J 15/3412 |
| 2017/0261107 A1 | 9/2017 | Martin | F16J 15/3452 |
| 2017/0350407 A1 | 12/2017 | Yamamoto et al. | F04D 29/046 |
| 2018/0017163 A1 * | 1/2018 | Hosoe | F16J 15/164 |
| 2018/0073394 A1 | 3/2018 | Tokunaga et al. | F01D 25/18 |
| 2018/0112711 A1 | 4/2018 | Itadani | F16J 15/363 |
| 2018/0128377 A1 | 5/2018 | Tukunaga et al. | F16J 15/342 |
| 2018/0128378 A1 * | 5/2018 | Tokunaga | F16J 15/3412 |
| 2018/0135699 A1 | 5/2018 | Tokunaga et al. | F16C 33/80 |
| 2018/0172162 A1 | 6/2018 | Tokunaga et al. | F16J 15/34 |
| 2018/0195618 A1 | 7/2018 | Itadani et al. | F16J 15/3416 |
| 2018/0299015 A1 | 10/2018 | Itadani | F16J 15/3448 |
| 2019/0170257 A1 * | 6/2019 | Hosoe | F16J 15/3424 |
| 2019/0285115 A1 | 9/2019 | Negishi et al. | F16C 17/045 |
| 2019/0301522 A1 | 10/2019 | Negishi et al. | F16C 17/02 |
| 2019/0331162 A1 | 10/2019 | Negishi | F16J 15/34 |
| 2020/0224768 A1 | 7/2020 | Imura | F16J 15/3412 |
| 2020/0240470 A1 | 7/2020 | Sorgenti | F16J 15/3212 |
| 2020/0332901 A1 * | 10/2020 | Imura | F16J 15/3412 |
| 2021/0041026 A1 * | 2/2021 | Imura | F16J 15/3424 |
| 2021/0048062 A1 * | 2/2021 | Masumi | F16J 15/3412 |
| 2021/0048106 A1 * | 2/2021 | Imura | F16J 15/3424 |
| 2021/0080009 A1 * | 3/2021 | Kimura | F16J 15/3412 |
| 2021/0116030 A1 * | 4/2021 | Kimura | F16J 15/441 |
| 2021/0364034 A1 | 11/2021 | Okada | F16J 15/342 |

FOREIGN PATENT DOCUMENTS

| | | | |
|---|---|---|---|
| CN | 1401924 | 3/2003 | F16J 15/16 |
| CN | 101644333 | 2/2010 | F16J 15/34 |
| CN | 201496542 | 6/2010 | F16J 15/16 |
| CN | 101793169 | 8/2010 | F01D 11/08 |
| CN | 101793324 | 8/2010 | F16J 15/16 |
| CN | 101861485 | 10/2010 | F16J 15/34 |
| CN | 203098871 | 7/2013 | F16J 15/34 |
| CN | 103557229 | 2/2014 | F16C 17/04 |
| CN | 103557334 | 2/2014 | F16J 15/34 |
| CN | 203641506 | 6/2014 | F16J 15/16 |
| CN | 104169622 | 11/2014 | F16J 15/34 |
| CN | 104321568 | 1/2015 | F16C 33/72 |
| CN | 104685273 | 6/2015 | F16J 15/34 |
| CN | 106029294 | 10/2016 | B23K 26/364 |
| CN | 205877184 | 1/2017 | F16J 15/16 |
| CN | 205877198 | 1/2017 | F16J 15/34 |
| CN | 106439023 | 2/2017 | F16J 15/16 |
| CN | 107489770 | 12/2017 | F16J 15/34 |
| CN | 109237042 | 1/2019 | F16J 15/34 |
| CN | 110770456 | 2/2020 | F16C 33/12 |
| CN | 111656065 | 9/2020 | F16J 15/34 |
| DE | 3223703 | 6/1982 | F16J 15/34 |
| DE | 102008038396 | 2/2010 | F16K 15/34 |
| EP | 0369295 | 11/1988 | F16J 15/34 |
| EP | 0518681 | 12/1992 | G11B 15/60 |
| EP | 0637706 | 8/1993 | F16J 15/34 |
| EP | 2138225 | 12/2009 | B01J 13/20 |

(56) References Cited

FOREIGN PATENT DOCUMENTS

| | | | |
|---|---|---|---|
| EP | 2754931 | 7/2014 | ............... F16J 15/34 |
| EP | 3112078 | 1/2017 | ............ B23K 26/364 |
| EP | 3196516 | 7/2017 | ............... F16J 15/34 |
| EP | 3217049 | 9/2017 | ............... F16J 15/34 |
| EP | 3396186 | 10/2018 | ............... F16C 33/10 |
| EP | 3575621 | 12/2019 | ............... F16C 33/10 |
| EP | 3575643 | 12/2019 | ............... F16J 15/34 |
| EP | 3650722 | 5/2020 | ............... F16C 33/12 |
| FR | 2342440 | 9/1997 | ............... F16J 15/34 |
| GB | 1509482 | 5/1978 | ............... F16C 33/10 |
| GB | 2263952 | 8/1993 | ............... F16J 15/34 |
| JP | S51-034974 | 3/1976 | |
| JP | S52-143571 | 10/1977 | ............... F16J 15/26 |
| JP | 57163770 | 10/1982 | ............ F16J 15/3412 |
| JP | S59-195253 | 12/1984 | ............... F16J 15/34 |
| JP | S59-195254 | 12/1984 | ............... F16J 15/34 |
| JP | S63-190975 | 8/1988 | ............... F16J 15/34 |
| JP | H02-236067 | 9/1990 | ............... F16J 15/34 |
| JP | H02-136863 | 11/1990 | ............... F16J 15/34 |
| JP | H04-50559 | 2/1992 | ............... F16J 15/34 |
| JP | H04-337165 | 11/1992 | ............... F16J 15/34 |
| JP | H05-60247 | 3/1993 | ............... F16J 15/34 |
| JP | H05-296248 | 11/1993 | |
| JP | H05-90049 | 12/1993 | ............... F16J 15/34 |
| JP | H06-17941 | 1/1994 | ............... F16J 15/34 |
| JP | H06-117547 | 4/1994 | ............... F16J 15/34 |
| JP | H06-174107 | 6/1994 | ............... F16J 15/34 |
| JP | H06-323442 | 11/1994 | ............... F16J 15/34 |
| JP | H06-105105 | 12/1994 | ............... F16J 15/34 |
| JP | 9-89119 | 3/1997 | ............... F16J 15/34 |
| JP | 9-292034 | 11/1997 | ............... F16J 15/34 |
| JP | H10-281299 | 10/1998 | ............... F16J 15/34 |
| JP | H10-292867 | 11/1998 | |
| JP | H11-287329 | 10/1999 | ............... F16J 15/34 |
| JP | 3066367 | 5/2000 | ............... F16J 15/34 |
| JP | 2001-12458 | 1/2001 | ............ F16C 17/10 |
| JP | 2003-343730 | 12/2003 | ............... F16J 15/22 |
| JP | 2005-180652 | 7/2005 | ............... F16J 15/34 |
| JP | 2005-315391 | 11/2005 | |
| JP | 2005-337503 | 12/2005 | ............... F16J 15/34 |
| JP | 2006-77899 | 3/2006 | ............... F16J 15/34 |
| JP | 2006-90524 | 4/2006 | ............ F16C 17/02 |
| JP | 2006-183702 | 7/2006 | ............ F16C 17/04 |
| JP | 2007-162045 | 6/2007 | |
| JP | 2008-106940 | 5/2008 | ............... F16J 15/34 |
| JP | 2011-74931 | 4/2011 | ............... F16J 15/34 |
| JP | 2011-185292 | 9/2011 | ............... F16J 15/34 |
| JP | 2012-2295 | 1/2012 | ............... F16J 15/34 |
| JP | 2012-062534 | 3/2012 | |
| JP | 2012-122135 | 6/2012 | ............ C25D 15/02 |
| JP | 2013-213545 | 10/2013 | ............... F16C 32/06 |
| JP | 2015-063647 | 4/2015 | |
| JP | 2015-68330 | 4/2015 | ............... F04C 29/00 |
| JP | 2016-80090 | 5/2016 | ............... F16J 15/34 |
| WO | WO 2016186015 | 11/1920 | ............... F16J 15/34 |
| WO | WO 2006051702 | 5/2006 | ............... F16J 15/34 |
| WO | WO 2011115073 | 9/2011 | ............... F16J 15/34 |
| WO | WO 2012046749 | 4/2012 | ............... F16J 15/34 |
| WO | WO 2013035503 | 3/2013 | ............... F16J 15/34 |
| WO | WO2013053411 | 4/2013 | |
| WO | WO2014061544 | 4/2014 | |
| WO | WO2014148316 | 9/2014 | ............... F16J 15/34 |
| WO | WO2014148317 | 9/2014 | ............... F16J 15/34 |
| WO | WO2015111707 | 7/2015 | ............... F16J 15/18 |
| WO | WO2016035860 | 3/2016 | ............... F16J 15/34 |
| WO | WO 2016167262 | 10/2016 | ............... F16J 15/34 |
| WO | WO 2016186015 | 11/2016 | ............... F16J 15/34 |
| WO | WO 2016186019 | 11/2016 | ............... F16J 15/34 |
| WO | WO 2016186020 | 11/2016 | ............... F16J 15/34 |
| WO | WO 2016203878 | 12/2016 | ............... F16J 15/34 |
| WO | WO 2017002774 | 1/2017 | ............... F16J 15/34 |
| WO | WO 2017061406 | 4/2017 | ............... F16J 15/34 |
| WO | WO 2018092742 | 5/2018 | ............... F16J 15/34 |
| WO | WO 2018105505 | 6/2018 | ............... F16J 33/12 |
| WO | WO2018139231 | 8/2018 | ............... F16J 15/34 |
| WO | WO 2018139231 | 8/2018 | ............... F16J 15/34 |

OTHER PUBLICATIONS

Second Notification of Reason tbr Refusal with issued by the State Intellectual Property Office of China dated Feb. 5, 2016 for Chinese counterpart application No. 201380024836.9.
First Office Action issued in Chinese Patent Appln. Serial No. 201950007372.8, dated Sep. 27, 2021, with English translation, 13 pages.
International Search Report and Written Opinion issued in PCT/JP2019/003381, with English translation, dated Apr. 2, 2019, 20 pages.
International Preliminary Report on Patentability issued in PCT/JP2019/003381, with English translation, dated Aug. 4, 2020, 12 pages.
International Search Report and Written Opinion issued in PCT/JP2019/000617, dated Apr. 10, 2019, with English translation, 21 pages.
International Preliminary Report on Patentability issued in PCT/JP2019/000617, dated Jul. 14, 2020, with English translation, 13 pages.
International Search Report and Written Opinion issued in PCT/JP2020/003645, dated Mar. 24, 2020, with English translation, 21 pages.
International Preliminary Report on Patentability issued in PCT/JP2020/003645, dated Aug, 10, 2021, with English translation, 11 pages.
International Search Report and Written Opinion issued in PCT/JP2020/003641, dated Mar. 31, 2020, with English translation, 13 pages.
International Preliminary Report on Patentability issued in PCT/JP2020/003641, dated Aug. 10, 2021, with English translation, 7 pages.
International Search Report and Written Opinion issued in PCT/JP2020/003643, dated Mar. 17, 2020, with English translation, 17 pages.
International Preliminary Report on patentability issued in PCT/JP2020/003643, dated Aug. 10, 2021, with English translation, 10 pages.
International Search Report and Written Opinion issued in PCT/JP2020/003648, dated Mar. 10, 2020, with English translation, 13 pages.
International Preliminary Report on Patentability issued in PCT/JP2020/003648, dated Aug. 10, 2021, with English translation, 7 pages.
International Search Report and Written Opinion issued in PCT/JP2020/003647, dated Mar. 24, 2020, with English translation, 14 pages.
International Preliminary Report on Patentability issued in PCT/JP2020/003647, dated Aug. 10, 2021, with English translation, 8 pages.
International Search Report and Written Opinion issued in PCT/JP2020/011926, dated Apr. 28, 2020, with English translation, 12 pages.
International Preliminary Report on Patentability issued in PCT/JP2020/011926, dated Sep. 28, 2021, 4 pages.
Korean Official Action issued in related Korean Patent Application Serial No. 10-2020-7019822, dated Oct. 26, 2021 with English translation (4 pages).
European Search Report issued in related European Patent Application Serial No. 19738181.7, dated Sep. 13, 2021 (10 pages).
European Search Report issued in related European Patent Application Serial No. 19748058.5, dated Oct. 8, 2021 (9 pages).
Korean Official Action issued in related Korean Patent Application Serial No. 10-2020-7022307, dated Nov. 26, 2021 with translation, 13 pages.
U.S. Appl. No. 16/964,943, filed Jul. 24, 2020, Imura.
U.S. Appl. No. 16/959,105, filed Jun. 29, 2020, Imura.
U.S. Appl. No. 16/964,943, filed Jul. 24, 2020, Imura et al.

(56) References Cited

OTHER PUBLICATIONS

U.S. Appl. No. 17/424,847, filed Jul. 21, 2021, Hashimoto et al.
U.S. Appl. No. 17/424,850, filed Jul. 21, 2021, Ou et al.
U.S. Appl. No. 17/425,277, filed Jul. 22, 2021, Imura et al.
U.S. Appl. No. 17/425,281, filed Jul. 22, 2021, Suzuki.
U.S. Appl. No. 17/425,678, filed Jul. 23, 2021, Suzuki et al.
U.S. Appl. No. 17/433,561, filed Aug. 24, 2021, Miyazaki et al.
First Office Action issued in Chinese Patent Appln. Serial No. 202080010586.3, dated Aug. 8, 2022, with English translation, 15 pages.
First Office Action issued in Chinese Patent Appln. Serial No. 202080010580.6, dated Aug. 2, 2022, with English translation, 12 pages.
First Office Action issued in Chinese Patent Appln. Serial No. 202080010628.3, dated Aug. 2, 2022, with English translation, 15 pages.
First Office Action issued in Chinese Patent Appln. Serial No. 202080010661.6, dated Jul. 19, 2022, with English translation, 15 pages.
First Office Action issued in Chinese Patent Appln. Serial No. 202080011045.2, dated Jul. 18, 2022, with English translation, 10 pages.
First Office Action issued in Chinese Patent Appln. Serial No. 202080018532.1, dated Aug. 24, 2022, with English translation, 14 pages.
European Search Report issued in related European Patent Application Serial No. 20752802.7, dated Oct. 11, 2022 (7 pages).
European Search Report issued in related European Patent Application Serial No. 20752708, dated Oct. 4, 2022 (7 pages).
European Search Report issued in related European Patent Application Serial No. 20752625, dated Oct. 4, 2022 (10 pages).
European Search Report issued in related European Patent Application Serial No. 20752802, dated Oct. 11, 2022 (7 pages).
European Search Report issued in related European Patent Application Serial No. 20752709, dated Oct. 11, 2022 (9 pages).
Office Action issued in U.S. Appl. No. 16/959,105, dated Mar. 25, 2022, 39 pages.
Notice of Allowance issued in U.S. Appl. No. 16/322,811, dated Apr. 19, 2022, 11 pages.
Notice of Allowance issued in U.S. Appl. No. 16/964,943, dated Jan. 11, 2022, 8 pages.
Official Action issued in European Patent Application Serial No. 17841422.3, dated Feb. 15, 2022, 5 pages.
Chinese Official Action issued in related Chinese Patent Application Serial No. 201980010219.0, dated Apr. 18, 2022 with translation, 17 pages.
International Search Report and Written Opinion and International Preliminary Report on Patentability issued in PCT/JP2017/040830, dated Jan. 30, 2018, with English translations, 15 pages.
European Search Report issued in related European Patent Application Serial No. 20777157.7, dated Oct. 28, 2022 (7 pages).
European Search Report issued in related European Patent Application Serial No. 20752626.0, dated Oct. 4, 2022 (7 pages).
European Search Report issued in related European Patent Application Serial No. 20753172.4, dated Oct. 4, 2022 (7 pages).
Notice of Allowance issued in U.S. Appl. No. 16/959,105, dated Nov. 3, 2022, 9 pages.
Notice of Allowance issued in U.S. Appl. No. 17/690,911, dated Nov. 25, 2022, 11 pages.
Chinese Official Action issued in related Chinese Patent Application Serial No. 201980007372.8, dated Nov. 15, 2022 with translation, 7 pages.
Chinese Official Action issued in related Chinese Patent Application Serial No. 202080010661.6, dated Nov. 30, 2022 with translation, 15 pages.
A Second Office Action dated Jul. 25, 2016 by the State Intellectual Property Office of China counterpart application No. 201380029125.0.
First Notification of Reason for Refusal with Search Report dated Sep, 25, 2015 by the State Intellectual Property Office of China for Chinese counterpart application No. 201380029125.0.
First Notification of Reason for Refusal with Search Report issued by the State Intellectual Property Office of China dated Aug. 24, 2015 for Chinese counterpart application No. 201380024836.9.
First Notification of Reason for Refusal with Search Report issued by the State Intellectual Property Office of China dated Aug. 26, 2015 for Chinese counterpart application No. 201380009242.0.
Second Notification of Reason for Refusal with issued by the State Intellectual Property Office of China dated Feb. 5, 2016 for Chinese counterpart application No. 201380024836.9.
First Office Action issued in Chinese Patent Appln. Serial No. 201980007372.8, dated Sep. 27, 2021, with English translation, 13 pages.
First Office Action issued in Chinese Patent Appln. Serial No. 201980010219.0, dated Nov. 30, 2021, with English translation, 13 pages.
International Preliminary Report on Patentability and Written Opinion issued in PCT/JP2013/070713, dated Feb. 10, 2015.
International Search Report (ISR) dated Oct. 29, 2013, issued for International application No. PCT/JP2013/070713.
International Search Report and Written Opinion issued in PCT/JP2013/070714, dated Oct. 29, 2013, with English translation, 14 pages.
International Preliminary Report on Patentability issued in PCT/JP2013/070714, dated Feb. 10, 2015.

* cited by examiner

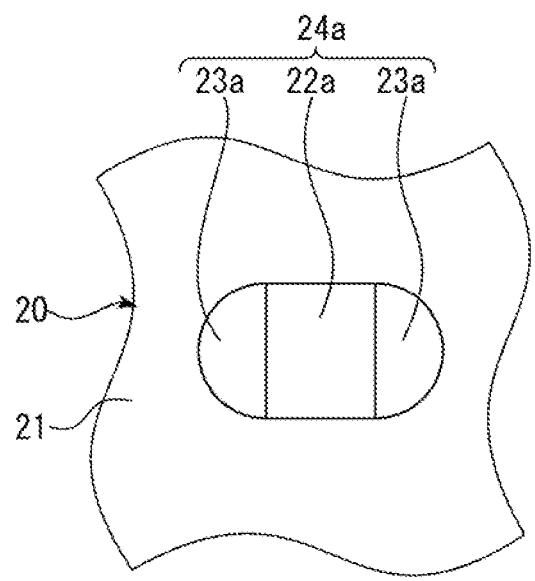 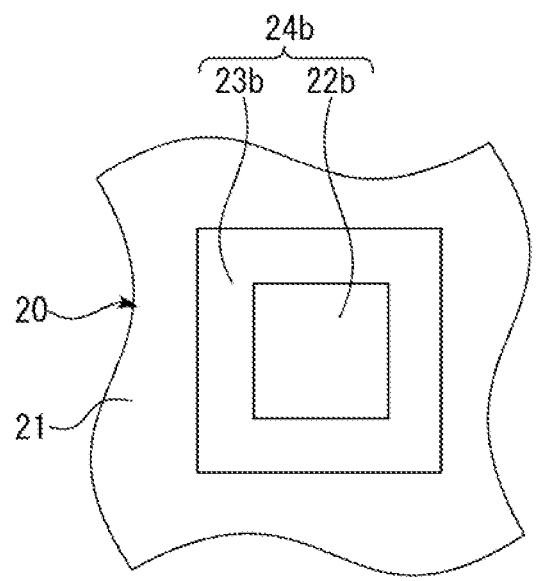
Fig. 9(a)　　　　　　　　Fig. 9(b)
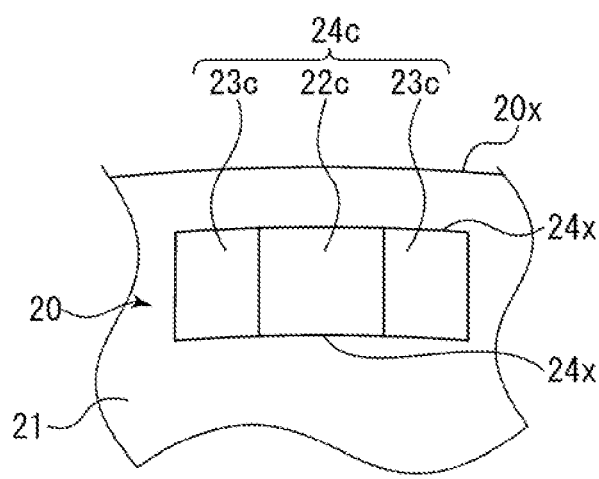 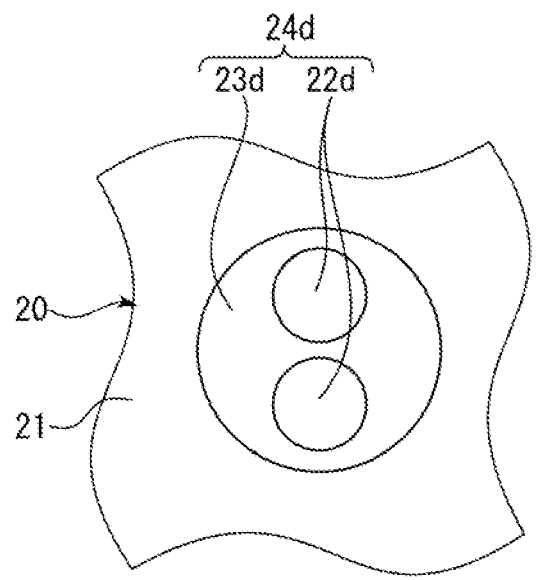
Fig. 9(c)　　　　　　　　Fig. 9(d)

SLIDING COMPONENTS

CROSS REFERENCE TO RELATED APPLICATION

This application is a divisional of U.S. patent application Ser. No. 16/964,943, filed Jul. 24, 2020, which in turn is a 371 US National Phase Patent Application based on PCT/JP2019/003381, filed Jan. 31, 2019, which claims benefit to Japanese Patent Application Serial No. 2018-016629, filed Feb. 1, 2018, the contents of which are incorporated herein by reference.

TECHNICAL FIELD

The present invention relates to sliding components that rotate relative to each other and are used for a mechanical seal in automobiles, general industrial machinery, other seal fields, and the like.

BACKGROUND ART

A sealing device for preventing sealed fluid leakage includes two components that are configured to rotate relative to each other and have end faces on flat surfaces sliding with respect to each other. Such a sealing device is, for example, a mechanical seal. In the mechanical seal, the conflicting conditions of "sealing" and "lubrication" have to be compatible for long-term sealability maintenance. In recent years in particular, there has been an increasing demand for further friction reduction in the interest of sealed fluid leakage prevention and mechanical loss reduction for environmental measures and so on. A friction reduction method can be achieved by dynamic pressure being generated between sliding surfaces by rotation and sliding being performed with a liquid film interposed.

Conventionally, a mechanical seal using the sliding components that are described in, for example, Patent Citation 1 is known as a mechanical seal generating dynamic pressure between sliding surfaces by rotation. In the sliding surface of one of the sliding components, a large number of two types of dimples having different depths are formed in the flat sliding surface and each dimple constitutes a Rayleigh step. When the sliding components rotate relative to each other, the counter-rotation direction side of the dimple has a negative pressure whereas a positive pressure is generated on the rotation direction side. Then, the positive pressure is increased by the wedge action of the end face wall of the dimple that is on the downstream side in the rotation direction, the positive pressure acts as a whole, and large buoyancy is obtained. In addition, stable slidability can be exhibited regardless of sealing conditions since the two types of dimples having different depths are formed.

In the mechanical seal, a positive pressure is generated between the sliding surfaces, and thus a fluid flows out of the sliding surface from the positive pressure part. This fluid outflow corresponds to sealed fluid leakage in the case of a seal.

CITATION LIST

Patent Literature

Patent Citation 1: JP 11-287329 A (Page 3, FIG. 2)

SUMMARY OF INVENTION

Technical Problem

Meanwhile, there is a demand for further "sealing" and "lubrication" improvement also in sliding components for a high-pressure sealed fluid, which can be sealed by a change in dimple shape or depth. Excessive depth has led to insufficient buoyancy and lubricity deterioration, on the other hand, excessive shallowness has led to confirmation of poor lubrication and lubricity deterioration, and there are problems in the form of a high-leakage or high-torque sliding component. These problems are obvious as the pressure of the sealed fluid becomes higher. Also conceivable is that the dimple depth tends to be reduced for sufficient buoyancy to be obtained as the high-pressure sealed fluid is targeted, the tendency results in a decrease in dimple volume, and the decrease in volume results in a decline in function to internally hold the sealed fluid.

The present invention is achieved to solve the problems of the conventional art, and an object of the present invention is to provide a low-torque sliding component with little high-pressure sealed fluid leakage.

Solution to Problem

In order to solve the above problems, sliding components according to the present invention have sliding surfaces rotated relative to each other with an annular mating ring and an annular seal ring facing each other and, as a result, seal a sealed fluid present on one radial side of each of the sliding surfaces rotating and sliding relative to each other. The sliding surface of at least one of the mating ring and the seal ring has therein a plurality of multi-stepped recess portions arranged in a circumferential direction, relative rotation and sliding of the mating ring and the seal ring causes the multi-stepped recess portions to generate a dynamic pressure. Each of the multi-stepped recess portions is formed in a stepwise shape in a cross-sectional view by a dynamic pressure recess portion and a static pressure recess portion with the dynamic pressure recess portion surrounding the static pressure recess portion deeper than the dynamic pressure recess portion. According to the aforesaid characteristic, during the relative rotation of the seal ring and the mating ring, each of the multi-stepped recess portions having the stepwise shape in a cross-sectional view allows the sealed fluid to be supplied from the static pressure recess portion deeper than the dynamic pressure recess portion to the dynamic pressure recess portion surrounding the static pressure recess portion. Therefore, the dynamic pressure can be reliably generated without poor lubrication. At this time, the dynamic pressure recess portion mainly fulfills a function to generate dynamic pressure between the sliding surfaces and adjust the contact surface pressure between the sliding surfaces and the static pressure recess portion mainly fulfills a function to supply the dynamic pressure recess portion on an outer diameter side with the sealed fluid held in the static pressure recess portion. In this manner, dynamic pressure is generated to the extent that the seal ring and the mating ring do not completely float relative to each other. As a result, the contact surface pressure is suppressed with the two sliding surfaces in contact with each other, and thus it is possible to obtain a low-torque sliding component with little high-pressure sealed fluid leakage.

It is preferable that the dynamic pressure recess portion and the static pressure recess portion are circular in a plan view. According to this preferable configuration, the pressure that is generated in the dynamic pressure recess portion can be raised smoothly.

It is preferable that the dynamic pressure recess portion is provided concentrically with the static pressure recess portion. According to this preferable configuration, the machining of the dynamic pressure recess portion and the static pressure recess portion in the sliding surface can be facilitated and use for the bidirectional relative rotation of the seal ring and the mating ring is possible.

It is preferable that the dynamic pressure recess portion is provided eccentrically in a rotation direction with respect to the static pressure recess portion. According to this preferable configuration, it is possible to generate a wide positive pressure region on the rotation direction side of the dynamic pressure recess portion with respect to the unidirectional relative rotation of the seal ring and the mating ring and a narrow negative pressure region on the counter-rotation direction side. As a result, the efficiency of dynamic pressure generation can be enhanced.

It is preferable that a circumferential length of the static pressure recess portion is longer than a circumferential length of the dynamic pressure recess portion. According to this preferable configuration, the region of static pressure generation exceeds the region of dynamic pressure generation, and thus the function of fluid holding by the static pressure recess portion can be enhanced.

It is preferable that the dynamic pressure recess portion includes a plurality of steps having different depths in a cross-sectional view. According to this preferable configuration, it is possible to give a steep peak to the positive pressure that is generated in the dynamic pressure recess portion, and thus the dynamic pressure generation efficiency can be enhanced.

It is preferable that the plurality of multi-stepped recess portions is disposed only on the sealed fluid side of the sliding surface of the mating ring or the seal ring. According to this preferable configuration, poor lubrication on the sealed fluid side can be prevented during the relative rotation of the seal ring and the mating ring.

It is preferable that a non-multi-stepped recess portion different in a cross-sectional view from each of the multi-stepped recess portions is disposed in the sliding surface of at least one of the mating ring and the seal ring. According to this preferable configuration, the plurality of multi-stepped recess portions formed on the sealed fluid side reliably generates dynamic pressure without poor lubrication and the non-multi-stepped recess portion internally holds the sealed fluid at a location where the multi-stepped recess portion is not formed. As a result, poor lubrication is unlikely to occur.

It is preferable that the dynamic pressure recess portion has a depth dimension smaller than an opening maximum diameter dimension thereof in a plan view and the static pressure recess portion has a depth dimension of 10 μm or more. According to this preferable configuration, the function of the static pressure recess portion of supplying the sealed fluid to the dynamic pressure recess portion on the outer diameter side is enhanced and the function of the static pressure recess portion of internally holding the sealed fluid is enhanced.

It is preferable that the sealed fluid is a high-pressure liquid of 0.1 MPa or more. According to this preferable configuration, the sliding surface has a low level of surface roughness and leakage hardly occurs even when the sealed fluid has a high pressure.

BRIEF DESCRIPTION OF DRAWINGS

FIGS. 9A to 9D are plan views illustrating a variation C of the multi-stepped recess portion of the first embodiment.

FIG. 10 illustrates a multi-stepped recess portion of sliding components according to a second embodiment of the present invention.

DESCRIPTION OF EMBODIMENTS

Modes for implementing sliding components according to the present invention will be described below based on embodiments.

First Embodiment

Sliding components according to a first embodiment of the present invention will be described with reference to FIGS. 1 to 9. It should be noted that a mechanical seal as an example of sliding components will be described as the present embodiment. In addition, the outer peripheral side of the sliding component constituting the mechanical seal is the sealed fluid side and the inner peripheral side of the sliding component is the atmosphere side.

Figure 1:
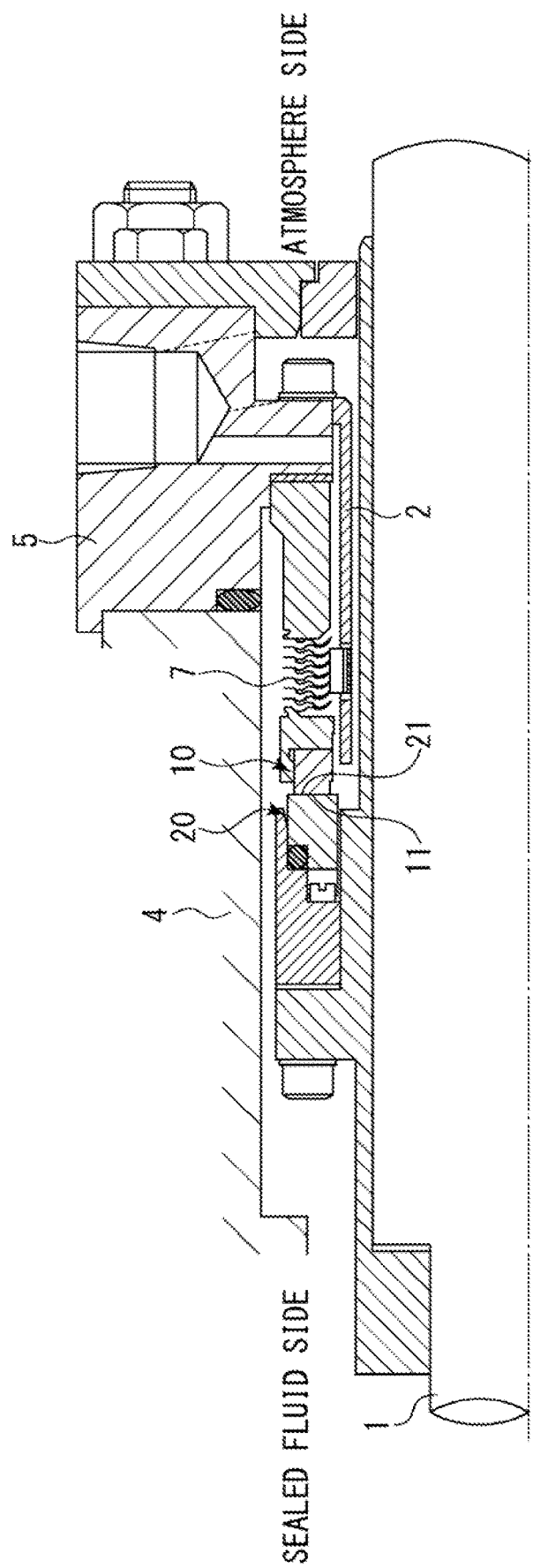
FIG. 1 is a cross-sectional view illustrating an example of a mechanical seal as sliding components according to a first embodiment of the present invention, for general industrial machinery.

The mechanical seal for general industrial machinery illustrated in FIG. 1 is an inside mechanical seal that seals a sealed fluid to leak from the outer peripheral side to the inner peripheral side of a sliding surface. The mechanical seal for general industrial machinery illustrated in FIG. 1 mainly includes an annular mating ring 20 and an annular seal ring 10. The mating ring 20 is provided on a rotary shaft 1 side in a state of being rotatable integrally with the rotary shaft 1 via a sleeve 2. The seal ring 10 is provided on a seal cover 5 fixed to a housing 4 of an attached device in a non-rotation state and in a state of being axially movable. By a bellows 7 biasing the seal ring 10 in the axial direction, a sliding surface 11 of the seal ring 10 and a sliding surface 21 of the mating ring 20 mirror-finished by wrapping or the like slide closely together. It should be noted that the sealed fluid in this implementation is a high-pressure liquid of 0.1 MPa or more.

Although the seal ring 10 and the mating ring 20 are typically formed of SiC (grouped into hard material) or a combination of SiC (grouped into hard material) and carbon (grouped into soft material), the present invention is not limited thereto and a sliding material is applicable insofar as the sliding material is used as a sliding material for a mechanical seal. It should be noted that a material including two or more phases different in component and composition and including a sintered body using boron, aluminum, carbon, or the like as a sintering aid can be used as the SiC. It should be noted that examples of the material include SiC in which graphite particles are dispersed, reaction sintered SiC containing SiC and Si, SiC—TiC, and SiC—TiN. It should be noted that resin-molded carbon, sintered carbon, and the like can be used as the carbon, examples of which include carbonaceous and graphitic mixed carbon. In addition, other than the sliding material described above, a metal material, a resin material, a surface modifying material (or coating material), a composite material, and the like are also applicable.

Figure 2:
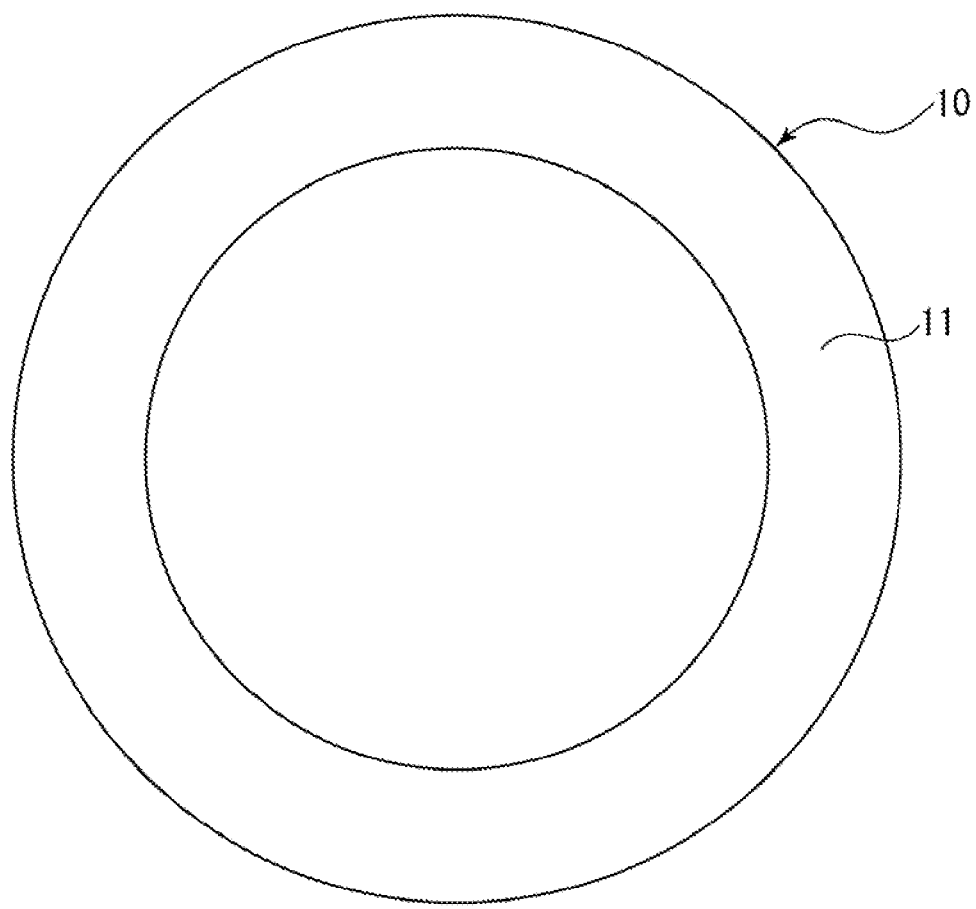
FIG. 2 is a plan view illustrating the sliding surface of a seal ring in the first embodiment of the present invention.

As illustrated in FIG. 2, the seal ring 10 has the sliding surface 11, which is annular in a front view seen from the axial direction, at one end in the axial direction. The sliding surface 11 is formed as a flat surface.

Figure 3:
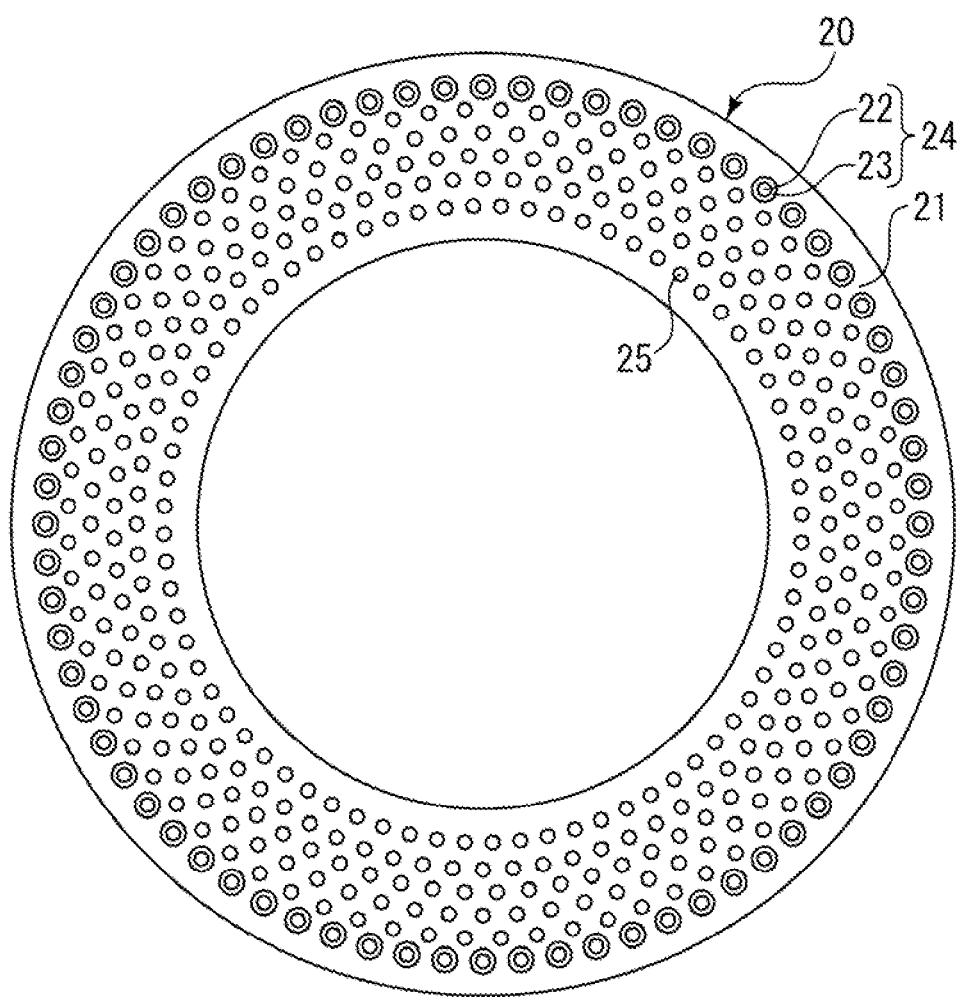
FIG. 3 is a plan view illustrating the sliding surface of a mating ring in which a non-multi-stepped recess portion and a multi-stepped recess portion disposed so as to face the seal ring of FIG. 2 are formed.

As illustrated in FIG. 3, the mating ring 20 has the annular sliding surface 21 facing the sliding surface 11 of the seal ring 10 in the axial direction. The sliding surface 21, which is a flat surface, has, in the circumferential direction, a plurality of multi-stepped recess portions 24 in which at least two steps are formed and dimples 25 (also referred to as non-multi-stepped recess portions or dimples) in which only one step or no step is formed. The multi-stepped recess portion 24, which is disposed on the outer diameter side (i.e., sealed fluid side in the embodiment) of the sliding surface 21, includes a dimple 22 (also referred to as a static pressure recess portion) and a counterbore 23 (also referred to as a dynamic pressure recess portion) formed around the dimple 22. It should be noted that the sliding surface 21 can be said to be a land portion with respect to the multi-stepped recess portion 24 and the dimple 25 and the counterbore 23 is surrounded by the sliding surface 21 without interruption over the entire circumference.

Figure 5:
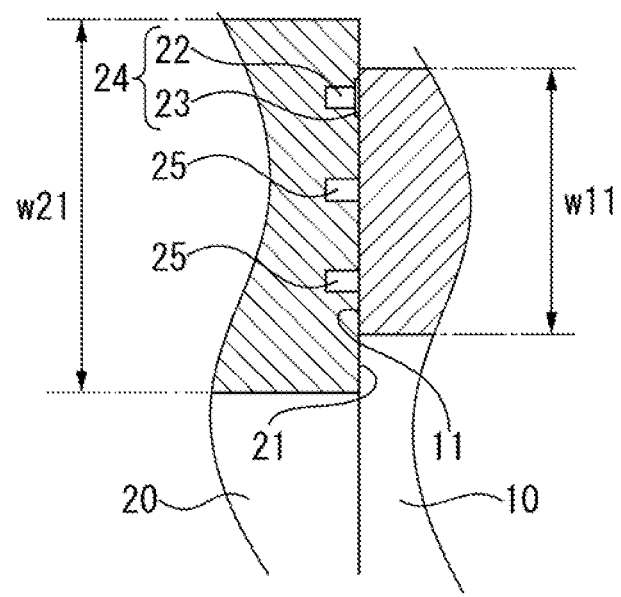
FIG. 5 is a cross-sectional view at a time of non-rotation in which the seal ring and the mating ring of FIGS. 2 and 3 are radially cut.

In addition, a radial length w21 of the sliding surface 21 of the mating ring 20 is formed longer than a radial length w11 of the sliding surface 11 of the seal ring 10 (i.e., w11<w21, see FIG. 5).

Figure 4A:
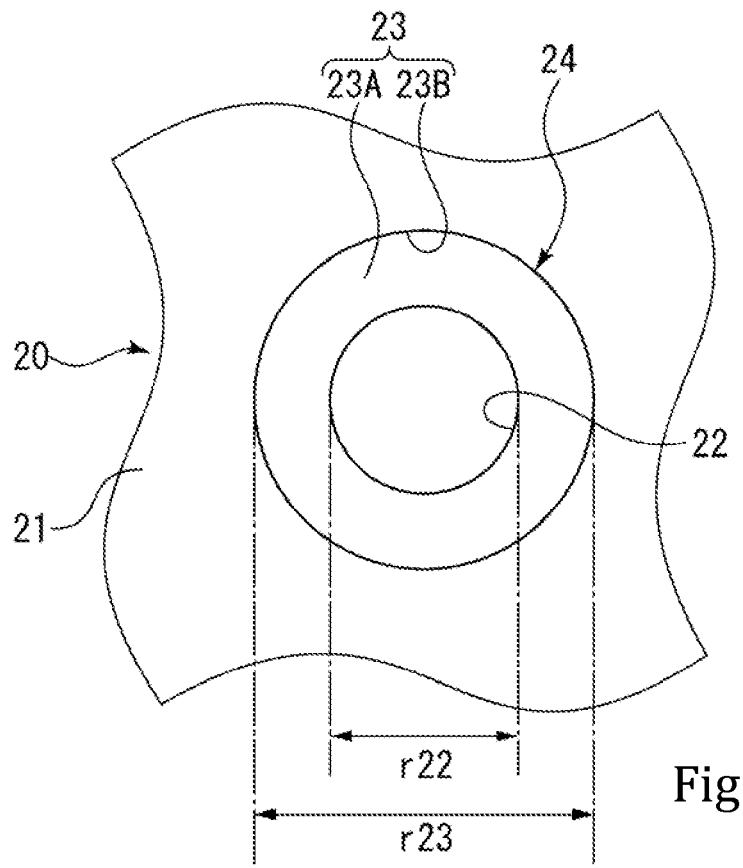
FIG. 4A is an enlarged plan view illustrating a dynamic pressure recess portion and a static pressure recess portion constituting the multi-stepped recess portion in the sliding surface of the mating ring in the first embodiment.
Figure 4B:
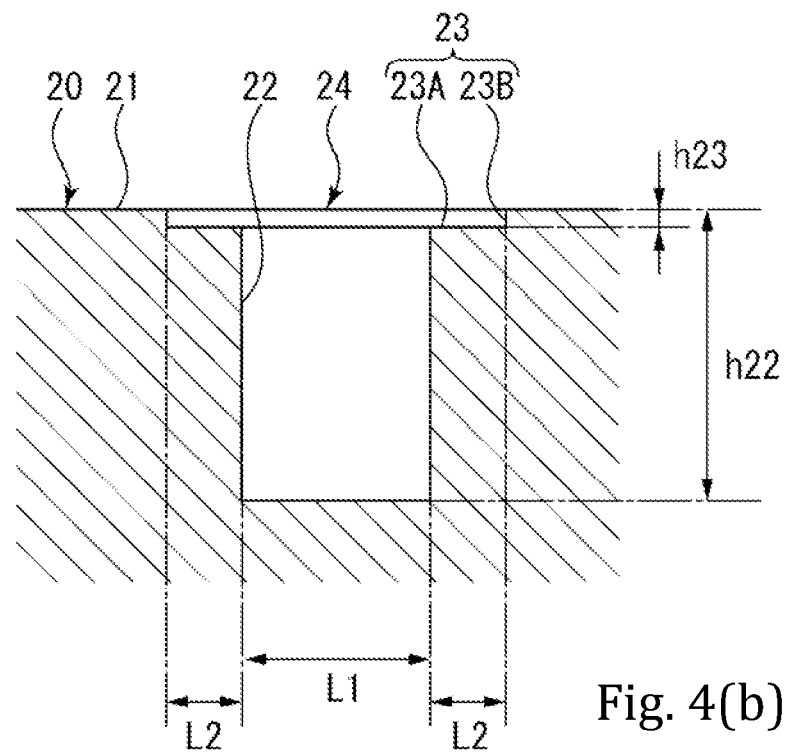
FIG. 4B is an enlarged cross-sectional view of the same in the first embodiment.

The dimple 22 of the multi-stepped recess portion 24 is formed in a circular shape in the front view seen from the axial direction (see FIGS. 3 and 4A) and is formed in a columnar shape having a substantially rectangular cross section in the radial direction (see FIGS. 4B and 5). The dimples 22 of the multi-stepped recess portions 24 are disposed in a staggered manner, six by six along with the dimples 25, in the radial direction in the entire sliding surface 21. It should be noted that the entire sliding surface 21 indicates a region that substantially slides on the sliding surface 11. Further, it should be noted that the dimple 25 and the dimple 22 of the multi-stepped recess portion 24 of the present embodiment are formed by laser machining, the present invention is not limited thereto, and the dimple 25 and the dimple 22 of the multi-stepped recess portion 24 of the present embodiment may be formed by another method.

In addition, a depth dimension h22 of the dimple 22 of the multi-stepped recess portion 24 is formed larger than an opening maximum diameter dimension r22 of the dimple 22 in the front view (i.e. r22<h22, see FIG. 4). As a result, the function of the dimple 22 of supplying the sealed fluid to the counterbore 23 formed around the dimple 22 is enhanced and the function of the dimple 22 of internally holding the sealed fluid is enhanced. It should be noted that the depth dimension h22 of the dimple 22 may be formed smaller than or substantially equal to the opening maximum diameter dimension r22 of the dimple 22 in the front view. In addition, it is preferable that the axial depth dimension h22 of the dimple 22 is 10 μm or more, at which no wedge action acts sufficiently.

The counterbore 23 is defined by a bottom surface 23A formed as a flat surface parallel to the sliding surface 21 on the outer diameter side of the dimple 22 and an inner peripheral wall 23B formed as a wall surface orthogonal to the bottom surface 23A. The counterbore 23 is formed in a circular shape in the front view seen from the axial direction (see FIGS. 3 and 4A) and as a concentric shallow groove surrounding the periphery of the dimple 22. As a result, the machining of the counterbore 23 and the dimple 22 in the sliding surface 21 can be facilitated and use for the bidirectional relative rotation of the seal ring 10 and the mating ring 20 is possible. In addition, in the multi-stepped recess portion 24, the counterbore 23 and the dimple 22 are formed in a circular shape in the front view, and thus the pressure that is generated in the counterbore 23 can be raised smoothly. Further, the inner peripheral wall 23B of the counterbore 23 is formed so as to be orthogonal in an edge shape to the sliding surface 21, and thus a large positive pressure can be generated. It should be noted that the counterbore 23 of the multi-stepped recess portion 24 of the present embodiment is formed by laser machining, the present invention is not limited thereto, and the counterbore 23 of the multi-stepped recess portion 24 of the present embodiment may be formed by another method.

In addition, a depth dimension h23 of the counterbore 23 is formed smaller than an opening maximum diameter dimension r23 of the counterbore 23 in the front view (i.e., h23<r23, see FIG. 4). As a result, the counterbore 23 is capable of generating sufficient dynamic pressure between the sliding surfaces 11 and 21. Further, the axial depth of the counterbore 23 is formed to be less than 5 μm, the axial depth of the counterbore 23 is preferably formed to be 1 μm or more, and the counterbore 23 is formed only in the dimple 22 (of the multi-stepped recess portion 24) disposed in the region of ½ or less, preferably ¼ or less, in the radial direction on the outer diameter side of the sliding surface 21 (see FIG. 3). As a result, the total force (i.e., buoyancy) of the dynamic pressures respectively generated in the counterbores 23 does not excessively increase. It should be noted that it is preferable that the counterbore 23 is not disposed on the inner diameter side of the sliding surface 11. In this manner, the outer diameter side of the sliding surface 21 is unlikely to come into direct contact with the facing sliding surface 11 during the relative rotation of the seal ring 10 and the mating ring 20 and poor lubrication on the outer diameter side with a high rotation speed can be prevented.

As illustrated in FIG. 4A, in the multi-stepped recess portion 24, the opening maximum diameter dimension r23 of the counterbore 23 is formed larger than the opening maximum diameter dimension r22 of the dimple 22 (i.e., r22<r23). In addition, as illustrated in FIG. 4B, the depth dimension h22 of the dimple 22 is formed larger than the depth dimension h23 of the counterbore 23 (i.e., h23<h22). In this manner, the multi-stepped recess portion 24 is formed in a stepwise shape in a cross-sectional view by the dimple 22 and the counterbore 23. Further, the circumferential length (L1) of the dimple 22 is formed longer than the circumferential length (2×L2) of the counterbore 23 (or the bottom surface 23A) (i.e., 2×L2<L1). As a result, the region of static pressure generation exceeds the region of dynamic pressure generation in the multi-stepped recess portion 24, and thus the function of fluid holding by the dimple 22 can be enhanced.

Figure 6:
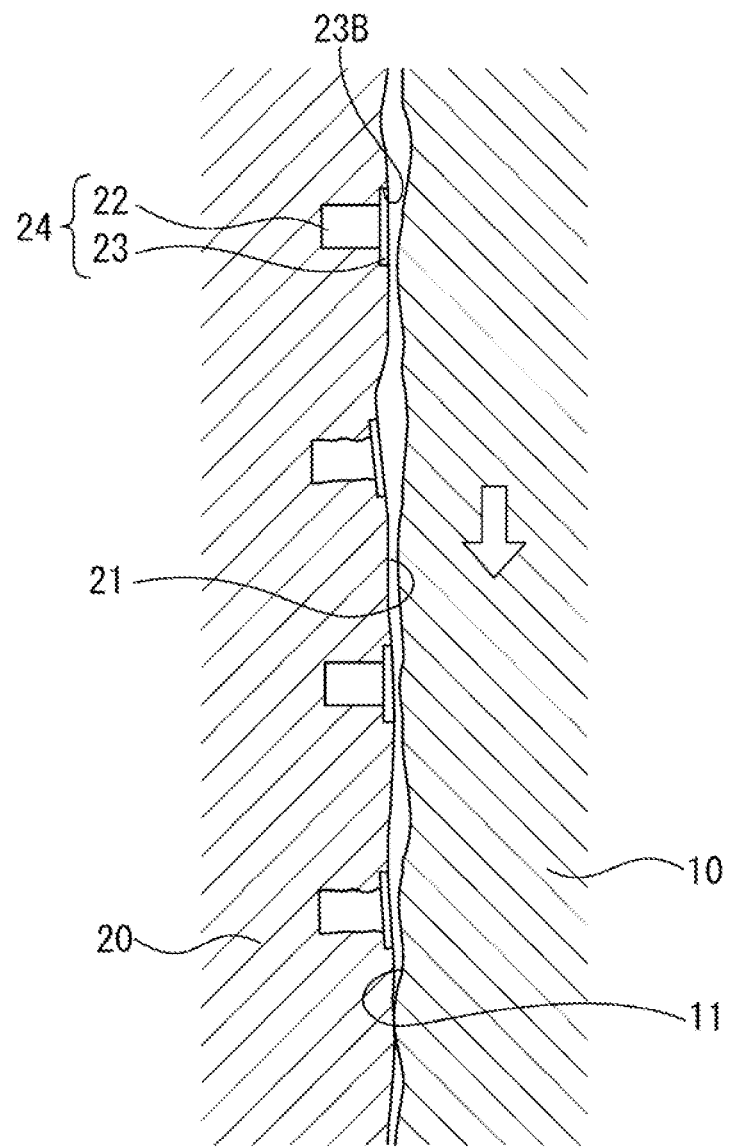
FIG. 6 is a schematic cross-sectional view at a time of rotation, which is circumferentially cut for description of dynamic pressure generation by the seal ring and the mating ring of FIGS. 2 and 3.

Next, dynamic pressure generation between the sliding surfaces 11 and 21 will be described. As illustrated in FIG. 6, when the seal ring 10 and the mating ring 20 rotate relative to each other (in the rotation direction that is indicated by the white arrow in FIG. 6, which is from the upper side of the page to the lower side of the page), the counter-rotation direction side of the counterbore 23 in the multi-stepped recess portion 24 (i.e., lower side of the page of FIG. 6: the opposite rotation direction side on the basis of the rotation direction of the counterpart-side seal ring 10) has a negative pressure whereas a positive pressure is generated on the rotation direction side (i.e., upper side of the page of FIG. 6). Then, the positive pressure is increased by the wedge action of the inner peripheral wall 23B on the rotation direction side of the counterbore 23, the positive pressure acts as a whole, and large buoyancy is obtained. In addition, the counterbore 23 is supplied with the sealed fluid from the dimple 22, which is deeper than the counterbore 23, and thus dynamic pressure can be reliably generated without poor lubrication. At this time, the counterbore 23 mainly fulfills a function to generate dynamic pressure between the sliding surfaces 11 and 21 and adjust the contact surface pressure between the sliding surfaces 11 and 21 and the dimple 22 mainly fulfills a function to supply the counterbore 23 with the sealed fluid held in the dimple 22. In addition, the non-multi-stepped dimple 25, where the counterbore 23 is not formed, also fulfills a function to internally hold the sealed fluid on the inner diameter side of the sliding surface 21, and thus poor lubrication is unlikely to occur on the sliding surfaces 11 and 21. Further, since the sliding surface 11 overlaps the counterbore 23 of the multi-stepped recess portion 24, which is formed on the outer diameter side of the sliding surface 21, in the radial direction as illustrated in FIG. 5, the counterbore 23 is not open to the outer diameter side (i.e., sealed fluid side in the embodiment) between the sliding surfaces 11 and 21 and the efficiency of dynamic pressure generation by the counterbore 23 is enhanced. It should be noted that the sliding surfaces 11 and 21 are microscopically wavy, as schematically illustrated in FIG. 6, due to surface roughness, undulation, and deformation attributable to dynamic pressure.

In this manner, the multi-stepped recess portion 24 generates dynamic pressure, by the counterbore 23 and the dimple 22 cooperating, to the extent that the seal ring 10 and the mating ring 20 do not completely float relative to each other. As a result, mixed lubrication is performed on the sliding surfaces 11 and 21 with fluid lubrication and boundary lubrication mixed and the sliding surfaces 11 and 21 come into contact with each other in part. As a result, the contact surface pressure is suppressed with the two sliding surfaces 11 and 21 in contact with each other, and thus it is possible to obtain a low-torque sliding component with little high-pressure sealed fluid leakage. Further, it is possible to suppress the surface roughness of the sliding surfaces 11 and 21 with the low torque. It should be noted that the dimple of the conventional art generates, unlike in the first embodiment, a fluid film that serves as fluid lubrication.

It should be noted that the inner peripheral wall 23B of the counterbore 23 may not be orthogonal to the bottom surface 23A and may, for example, intersect in an inclined state in a variation of the counterbore 23 of the multi-stepped recess portion 24 in the first embodiment. In addition, the bottom surface 23A may not be parallel to the sliding surface 21 and may be, for example, an inclined surface. Further, the bottom surface 23A may not be a flat surface and may be, for example, a curved surface.

Figure 7B:
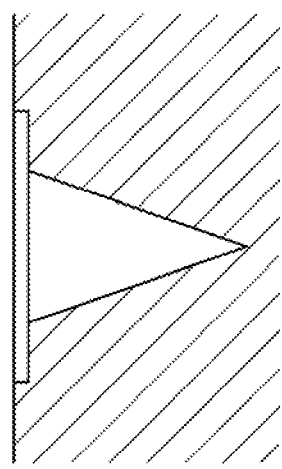
FIGS. 7A and 7B are cross-sectional views illustrating a variation A of the static pressure recess portion in the multi-stepped recess portion of the first embodiment.
Figure 7A:
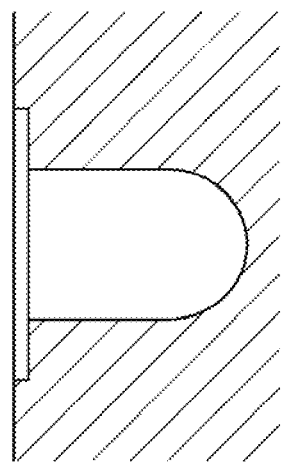

In addition, in a variation A of the dimple 22 of the multi-stepped recess portion 24 in the first embodiment, the cross-sectional shape of the dimple 22 may be formed in the conical shape that is illustrated in FIG. 7A or the semi-spheroidal shape that is illustrated in FIG. 7B.

Figure 8:
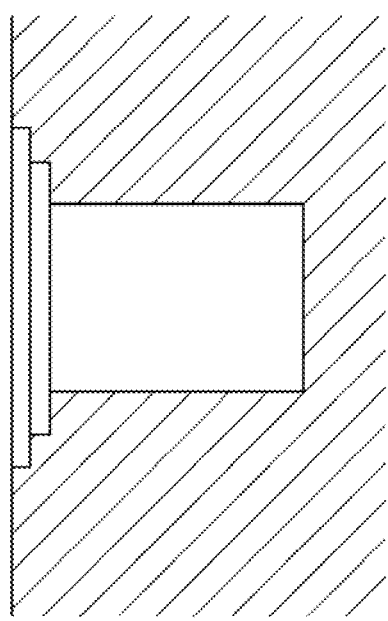
FIG. 8 is a cross-sectional view illustrating a variation B of the dynamic pressure recess portion in the multi-stepped recess portion of the first embodiment.

In addition, in a variation B of the counterbore 23 of the multi-stepped recess portion 24 in the first embodiment, the counterbore 23 may be formed as a two-stage counterbore having different depth dimensions as illustrated in FIG. 8. In this manner, it is possible to give a steep peak to the positive pressure that is generated in the counterbore, and thus the dynamic pressure generation efficiency can be enhanced. It should be noted that the counterbore is not limited to having a two-stage cross section and the counterbore may be formed in a plurality of stages having different depths in cross section.

Further, in a variation C of the multi-stepped recess portion 24 of the first embodiment, the shape in a plan view is different as illustrated in FIGS. 9A to 9D. It should be noted that the right and left direction in FIG. 9 is a direction along the circumferential direction of the sliding surface 21 and the up and down direction in FIG. 9 is the radial direction of the sliding surface 21.

As illustrated in FIG. 9A, a multi-stepped recess portion 24a is formed in a stadium shape as a whole in the front view with a dimple 22a, which is rectangular in the front view, sandwiched between two counterbores 23a, which are semicircular in the front view.

As illustrated in FIG. 9B, a multi-stepped recess portion 24b is formed in a square shape as a whole in the front view with a small dimple 22b, which is square in the front view, disposed in the middle of a counterbore 23b, which is square in the front view.

As illustrated in FIG. 9C, a multi-stepped recess portion 24c as a whole is formed in a belt shape in the front view with two counterbores 23c substantially rectangular in the front view sandwiching a dimple 22c substantially rectangular in the front view and circumferential surfaces 24x and 24y parallel to an outer peripheral surface 20x of the mating ring 20.

As illustrated in FIG. 9D, a multi-stepped recess portion 24d is formed in a circular shape as a whole in the front view with two small dimples 22d and 22d circular in the front view radially disposed in the middle of a counterbore 23d, which is circular in the front view.

It should be noted that the multi-stepped recess portion 24 can be configured by mutual combinations of variations A to C as a matter of course.

Second Embodiment

Next, sliding components according to a second embodiment of the present invention will be described with reference to FIG. 10. It should be noted that the same components as those described in the above embodiment are denoted by the same reference numerals without redundant description.

The sliding components in the second embodiment will be described. A dimple 122 (also referred to as a static pressure recess portion) of a multi-stepped recess portion 124 is formed in a circular shape in a front view seen from the axial direction as illustrated in FIG. 10A and in a columnar shape having a substantially rectangular cross section in the radial direction as illustrated in FIG. 10B.

A counterbore 123 (also referred to as a dynamic pressure recess portion) is defined by a bottom surface 123A formed as a flat surface parallel to the sliding surface 21 on the outer diameter side of the dimple 122 and an inner peripheral wall 123B formed as a wall surface orthogonal to the bottom surface 123A. The counterbore 123 is formed in a circular shape in the front view seen from the axial direction (see FIG. 10A) and as a shallow groove eccentric to the rotation direction side of the multi-stepped recess portion 124 (left side of the page of FIG. 10).

Figure 10A:
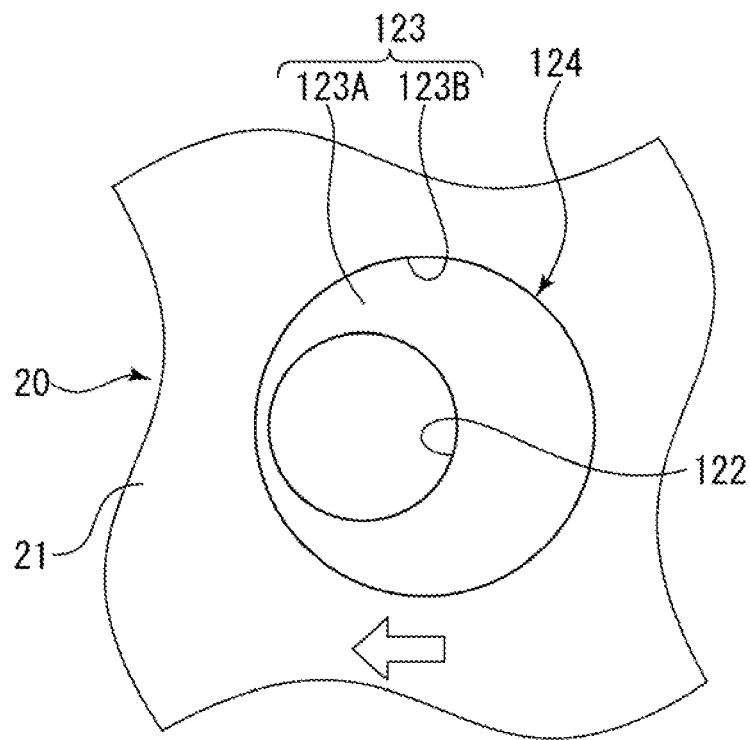
FIG. 10A is an enlarged plan view illustrating a dynamic pressure recess portion and a static pressure recess portion constituting the multi-stepped recess portion in the sliding surface of the mating ring.
Figure 10B:
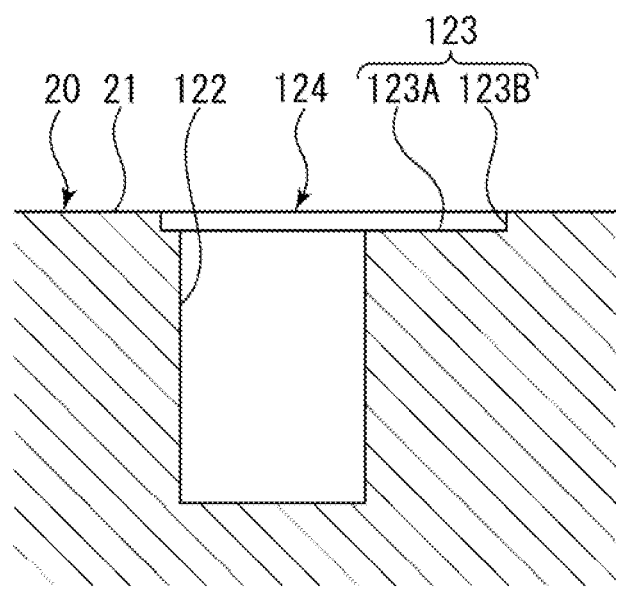
FIG. 10B is an enlarged cross-sectional view of the same.

According to such a configuration, it is possible to generate a wide positive pressure region on the rotation direction side of the counterbore 123 (i.e., right side of the page of FIG. 10) with respect to the unidirectional relative rotation of the seal ring 10 and the mating ring 20 (in the rotation direction that is indicated by the white arrow in FIG. 10A, which is from the right side of the page to the left side of the page) and a narrow negative pressure region on the counter-rotation direction side (i.e., left side of the page of FIG. 10). Accordingly, the efficiency of dynamic pressure generation can be enhanced.

Third Embodiment

Figure 11:
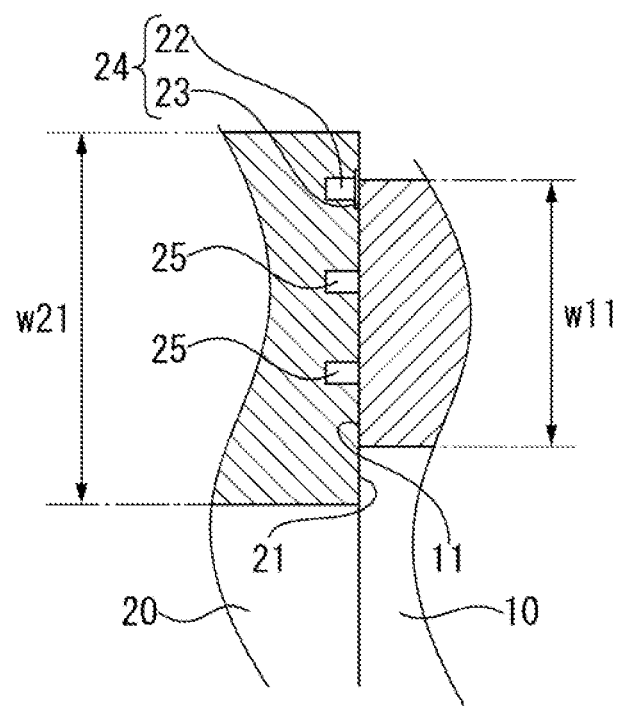
FIG. 11 is a cross-sectional view at a time of non-rotation in which the seal ring and the mating ring of sliding components according to a third embodiment of the present invention are radially cut.

Next, sliding components according to a third embodiment of the present invention will be described with reference to FIG. 11. It should be noted that the same components as those described in the above embodiments are denoted by the same reference numerals without redundant description.

The sliding components in the third embodiment will be described. As illustrated in FIG. 11, the outer diameter side (i.e., sealed fluid side in the embodiment) of the counterbore 23 of the multi-stepped recess portion 24 formed on the outer diameter side of the sliding surface 21 is slightly open between the sliding surfaces 11 and 21 due to the radial length difference between the sliding surfaces 11 and 21 (i.e., w11<w21).

According to such a configuration, the multi-stepped recess portion 24 is capable of contributing to the dynamic pressure generation between the sliding surfaces 11 and 21 by introducing sealed fluid-based static pressure from the open part on the outer diameter side of the counterbore 23.

Fourth Embodiment

Figure 12:
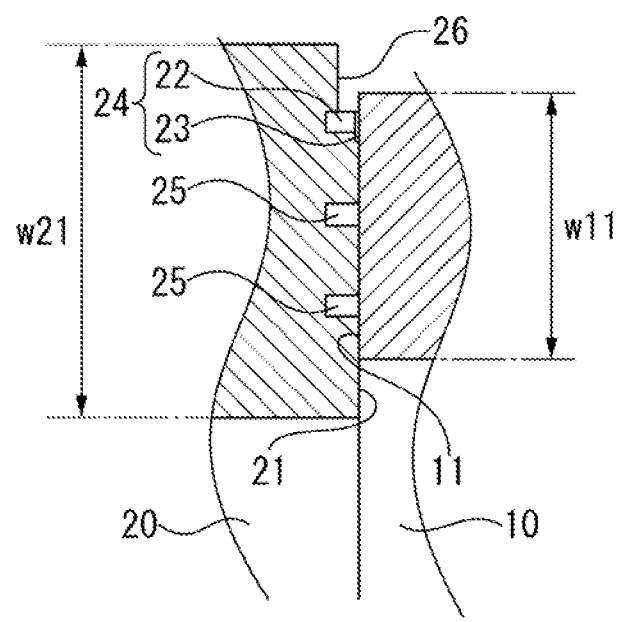
FIG. 12 is a cross-sectional view at a time of non-rotation in which the seal ring and the mating ring of sliding components according to a fourth embodiment of the present invention are radially cut.

Next, sliding components according to a fourth embodiment of the present invention will be described with reference to FIG. 12. It should be noted that the same components as those described in the above embodiments are denoted by the same reference numerals without redundant description.

The sliding components in the fourth embodiment will be described. As illustrated in FIG. 12, an axially recessed step portion 26 is formed on the outer diameter side of the mating ring 20 and the counterbore 23 of the multi-stepped recess portion 24 formed on the outer diameter side of the sliding surface 21 is slightly open on the outer diameter side (i.e., sealed fluid side in the embodiment) between the sliding surfaces 11 and 21.

Although embodiments of the present invention have been described above with reference to the drawings, specific configurations are not limited to the embodiments. Changes and additions without departing from the spirit of the present invention are also included in the present invention.

In addition, although a case where a sliding component constitutes a mechanical seal has been described as an example in the embodiment described above, the present invention is not construed as being limited thereto. Various changes, modifications, and improvements based on the knowledge of those skilled in the art can be made without departing from the scope of the present invention.

For example, although a mechanical seal for general industrial machinery has been described as an example of the sliding component, another mechanical seal such as a mechanical seal for water pumps may also be used. In addition, the mechanical seal may also be an outside mechanical seal.

In addition, although an example in which a multi-stepped recess portion and a non-multi-stepped dimple are provided only in a mating ring has been described in the embodiment described above, the multi-stepped recess portion and the non-multi-stepped dimple may be provided only in a seal ring or may be provided in both the seal ring and the mating ring.

In addition, the present invention is not limited to the description of the embodiment in which the multi-stepped recess portion is disposed over the circumferential direction on the outer diameter side of the sliding surface and the non-multi-stepped dimple is disposed on the inner diameter side. For example, only the multi-stepped recess portion may be disposed on the outer diameter side of the sliding surface with no non-multi-stepped dimple disposed. Alternatively, the multi-stepped recess portion may be disposed on the entire surface of the sliding surface with no non-multi-stepped dimple disposed. Alternatively, the multi-stepped recess portion and the non-multi-stepped dimple may be alternately disposed in the circumferential direction on the outer diameter side of the sliding surface. It should be noted that too many multi-stepped recess portions result in an increase in generated dynamic pressure, too few multi-stepped recess portions result in more change in dynamic pressure acting over the circumferential direction of the sliding surface, and thus it is preferable to appropriately set the number of the multi-stepped recess portions in accordance with the environment of use and the like.

In addition, although a mechanical seal has been described as an example of a sliding component, a non-mechanical seal sliding component such as a slide bearing may also be used.

REFERENCE SIGNS LIST

1 Rotary shaft
2 Sleeve
4 Housing
5 Seal cover
7 Bellows
10 Seal ring (sliding components)
11 Sliding surface
20 Mating ring (sliding components)

21 Sliding surface
22 Dimple (static pressure recess portion)
23 Counterbore (dynamic pressure recess portion)
23A Bottom surface
23B Inner peripheral wall
24 Multi-stepped recess portion
25 Dimple (non-multi-stepped recess portion)
122 Dimple (static pressure recess portion)
123 Counterbore (dynamic pressure recess portion)
123A Bottom surface
123B Inner peripheral wall
124 Multi-stepped recess portion

The invention claimed is:

1. A seal assembly, comprising an annular mating ring with a sliding surface and an annular sealing ring with a sliding surface, the sliding surfaces facing each other, being relatively rotatable with respect to each other, and being capable of sealing a sealed fluid present on one radial side of each sliding surface,
   wherein the sliding surface of at least one of the mating ring and the seal ring has therein a plurality of multi-stepped recess portions arranged in a circumferential direction and relative rotation and sliding of the mating ring and the seal ring causes the multi-stepped recess portions to generate a dynamic pressure,
   wherein each of the multi-stepped recess portions is formed in a stepwise shape in a cross-sectional view by a dynamic pressure recess portion and a static pressure recess portion with the dynamic pressure recess portion surrounding the static pressure recess portion deeper than the dynamic pressure recess portion, and
   wherein the multi-stepped recess portions are disposed only on the one radial side of the sliding surface of the mating ring or the seal ring.

2. The seal assembly according to claim 1, wherein the dynamic pressure recess portion and the static pressure recess portion are circular in a plan view from an axial direction.

3. The seal assembly according to claim 1, wherein the dynamic pressure recess portion is provided concentrically with the static pressure recess portion in a plan view from an axial direction.

4. The seal assembly according to claim 1, wherein the dynamic pressure recess portion is provided eccentrically in a rotation direction with respect to the static pressure recess portion.

5. The seal assembly according to claim 1, wherein assuming that a length of the static pressure recess portion in a circumferential direction is a length L1 and a length of the dynamic pressure recess portion in the circumferential direction is a length L3, the lengths L1 and L3 are defined by L1>L3−L1.

6. The seal assembly according to claim 1, wherein the dynamic pressure recess portion includes a plurality of steps having different depths in cross section.

7. The seal assembly according to claim 6, wherein a non-multi-stepped recess portion different in a cross-sectional view from each of the multi-stepped recess portions is disposed in the sliding surface of at least one of the mating ring and the seal ring.

8. The seal assembly according to claim 1, wherein the dynamic pressure recess portion has a depth dimension smaller than an opening maximum diameter dimension thereof in a plan view and the static pressure recess portion has a depth dimension of 10 μm or more.

9. The seal assembly according to claim 1, wherein the sealed fluid is a high-pressure liquid of 0.1 MPa or more.

10. The seal assembly according to claim 2, wherein the dynamic pressure recess portion is provided concentrically with the static pressure recess portion.

* * * * *